Oct. 4, 1949.  C. H. KNIGHT  2,483,648
WASHING THICKENER SYSTEM
Filed Sept. 19, 1945  4 Sheets-Sheet 1

INVENTOR:
CYRIL H. KNIGHT,
BY
ATTORNEY

Oct. 4, 1949.  C. H. KNIGHT  2,483,648
WASHING THICKENER SYSTEM
Filed Sept. 19, 1945  4 Sheets-Sheet 2
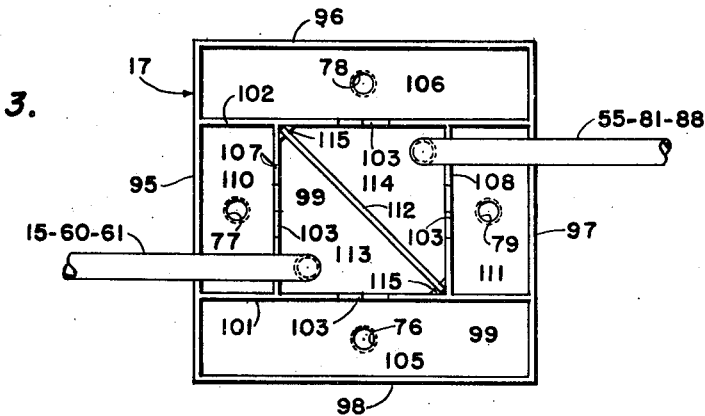
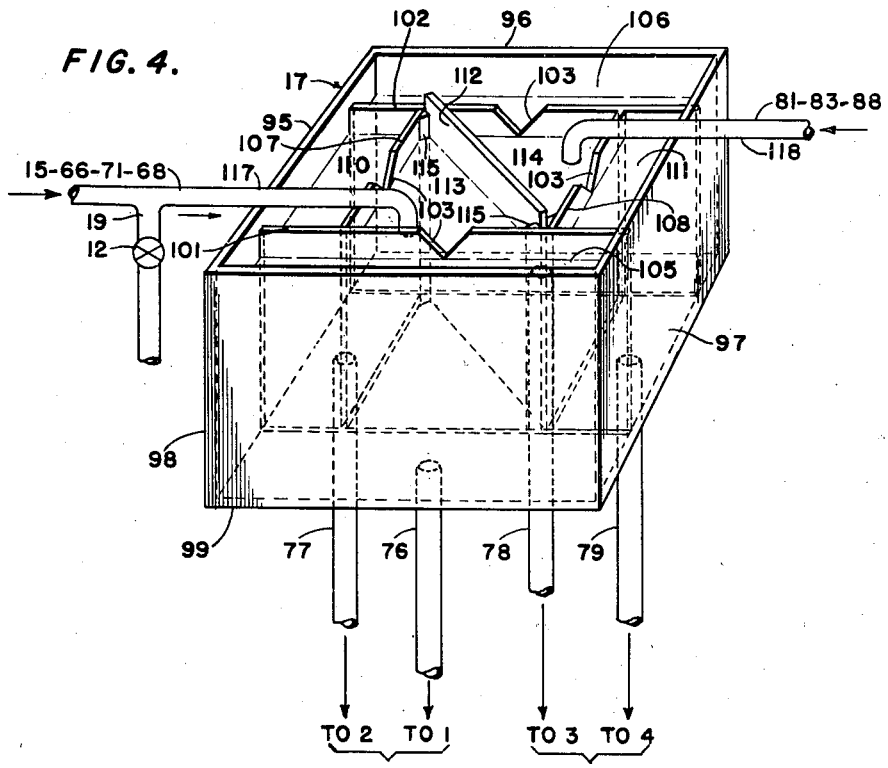
INVENTOR:
CYRIL H. KNIGHT,
BY Arthur Middleton
ATTORNEY

INVENTOR:
CYRIL H. KNIGHT,
BY
ATTORNEY

Oct. 4, 1949.  C. H. KNIGHT  2,483,648
WASHING THICKENER SYSTEM
Filed Sept. 19, 1945  4 Sheets-Sheet 4

INVENTOR:
CYRIL H. KNIGHT,
BY
Arthur Middleton
ATTORNEY

Patented Oct. 4, 1949

2,483,648

UNITED STATES PATENT OFFICE 2,483,648

WASHING THICKENER SYSTEM

Cyril H. Knight, Toronto, Ontario, Canada, assignor to The Dorr Company, New York, N. Y., a corporation of Delaware Application September 19, 1945, Serial No. 617,240
In Canada April 7, 1945

14 Claims. (Cl. 210—55)

This invention relates to the separation of mother or other liquor suspensions into clarified liquor as one fraction, and as another fraction the solid-phase precipitate or residue suspended in the mother or other liquor.

The invention has to do with such mother liquors where the liquor has metal-corrosive characteristics, and especially liquors bearing compounds of sodium, and possibly sulphur, and more particularly sodium hydroxide. Such liquors are encountered in the causticizing of green liquor as used in the paper industry, wherein green liquor (essentially $Na_2CO_3$) is causticized with lime to yield a mother liquor (called white liquor) containing solid phase calcium carbonate ($CaCO_3$) and sodium hydroxide (NaOH). The liquor may, and usually does, include other constituents such as possibly sodium sulfide ($Na_2S$).

In green liquor causticizing, the separation or fractionation of the white mother liquor to remove its precipitated solids as white mud, to yield a clarified decanted strong white liquor, the mother liquor is usually primarily treated in a balanced tray clarifier equivalent to that disclosed in the U. S. A. patent to Weber, No. 1,770,353, from which decanted clarified white liquor is discharged as effluent or overflow, while the settled white mud or sludge is discharged as thickened underflow. The clarified decanted white liquor goes to the wood-digesting station, but the white mud underflow, while thickened, has enough white liquor entrained in it to require further recovery of the entrained white liquor.

Therefore, such white mud underflow is usually treated in a secondary thickening station for the purpose of obtaining a white mud from which the soluble sodium compounds have been more completely recovered. The underflow from this secondary thickening station is usually further treated in a continuous filter which is necessary to further dewater the lime mud and complete the removal of soluble sodium salts to a point where the white mud can be reburned in a lime kiln or economically discarded to waste.

On occasion the primary white mud thickening station is shut down for repairs, due primarily to the corrosive nature of the mother liquor. When this happens, of course, the entire plant must be shut down unless the secondary white mud thickener can assume the function of the primary. This has sometimes been provided for by making the secondary a duplicate of the primary but because the white mud settles twice as fast in the secondary owing to the weaker caustic solution there encountered, the secondary thickener is therefore 100% oversize and this extra capacity is wasted during normal operation. My invention uses this wasted capacity to provide an extra thickening step.

The continuous filters normally used to dewater and complete the final washing of the white mud from the secondary thickener are essentially variable in their operation in that dewatering and washing efficiency drops steadily as the filter medium becomes blinded and very suddenly if the washing sprays are not kept by the operators in perfect condition. With the normal prior washing of the mud fed the filter obtainable by the use of only a primary and one secondary thickening step, the filter must be kept in perfect operating condition to produce a mud low enough in soda for reburning or economical discard. Also, a continuous filter must be shut down at intervals to acid treat the filter medium or to replace it or to make other minor repairs inherent in the present-day design of filters. With the filter down for repairs, the whole plant must be shut down because with the white mud treated only in the usual primary and secondary thickening stations, the soda content of the lime mud is excessive. These two problems have been met in two ways—either by installing washing type thickener giving two thickening steps for the secondary thickener, or by installing two filters operating in series. The use of the washing type thickener is objectionable because it cannot assume the functions of the primary thickener and also because, as all the settling in each stage must be done in one compartment, the area and space requirements are large as compared to my invention. The use of two filters in series is objectionable because of their high cost of operation.

The objects of my invention therefore are threefold, in that it is capable of assuming the functions of the primary thickener, it gives two stages of thickening in one tank, thus producing lower soda losses during normal operation, and finally, by means of the extra decantation, allows the plant to continue operation even with the filter shut down for repairs.

The invention is illustrated in the accompanying drawings by showing the best embodiment of the invention now known to me, but it is to be understood that the embodiment has been chosen for illustrative and not limiting purposes, since the invention obviously can be practiced in other embodiments and mechanical arrangements so long as they fall within the ambit defined in the accompanying claims.

In the drawings—

Fig. 1 is a flow-sheet or flow-chart showing the various stations to give the environment of the invention.

Fig. 2 is a vertical sectional view through the secondary or composite washing thickener tank with only enough parts shown to be illustrative of the total machine, while piping is shown associated with it, the piping being rather symbolic of the possible flow-paths of fluid to and from the thickener. Valves are indicated to help the reader understand the controls to be exercised on the flows of liquid, but valves themselves (except possibly valve 84) are not likely to be used, since their control function is largely exercised in the feed-splitter station.

Fig. 3 is a plan view of a feed-splitter station and Fig. 4 is an isometric view of a feed-splitter station which shows particularly the relative positions of piping and partitions.

Figure 1:
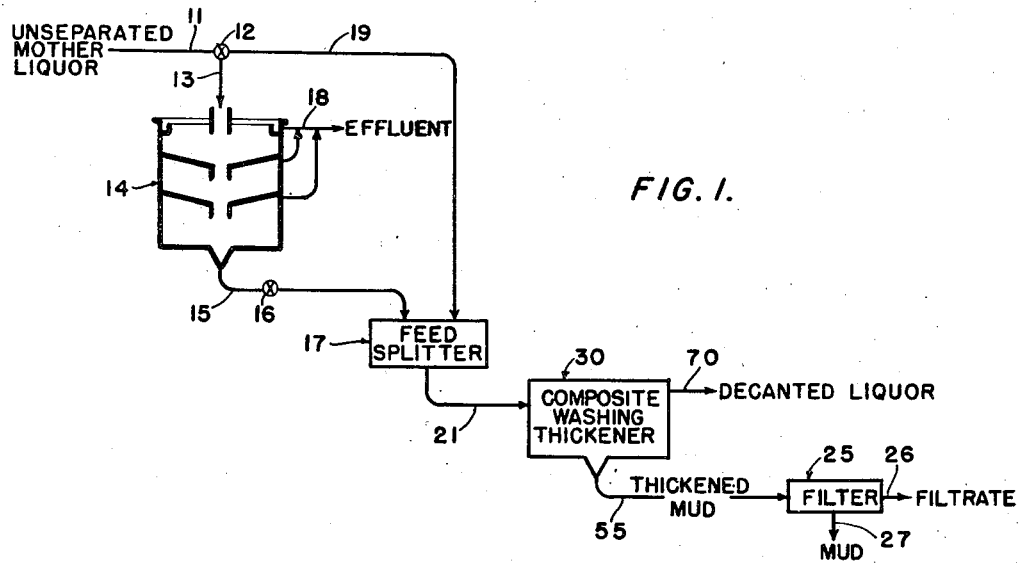
Figure 5:
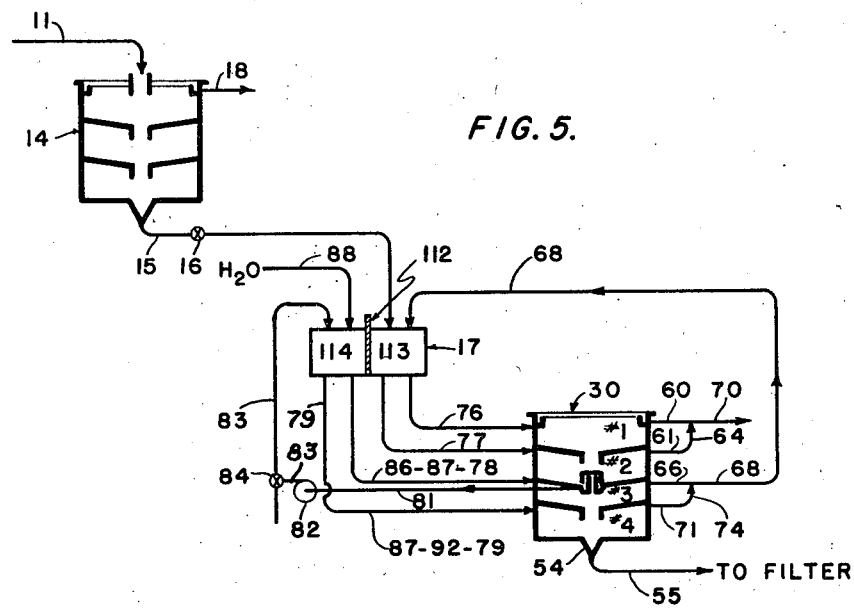
Fig. 5 is a symbolic flow diagram of the primary thickener and the secondary thickener, showing in the simplest form the direction of liquid flows, especially when the primary thickener is in flow and normal operation.

In the drawings, in referring to Figs. 1 and 5, 11 represents a flow-path or pipe through which the unseparated mother liquor flows past a control valve 12, through pipe 13 into the primary balanced tray thickener 14, having a mud underflow pipe or conduit 15 controlled by a valve 16, with the mud passing into the feed splitter 17 of this invention. Clarified decanted white liquor passes from the thickener 14 through the overflow pipes 18 for conduction to the wood-digesting station. If the valve 12 in pipe 11 is closed to cut out the thickener 14 from operation (Fig. 6), the unseparated mother liquor then passes through the pipe or conduit 19 directly to the feed splitter 17.

From the feed splitter 17 the liquor is passed to the composite washing thickener station 30, from which the decanted white liquor overflows through pipe or effluent outflow conduit 70, while thickened mud underflow passes therefrom through underflow pipe 55, usually to a continuous filter 25, arranged to discharge filtrate through pipe 26 and a filter cake comprising mud through the pipe 27.

Figure 2:
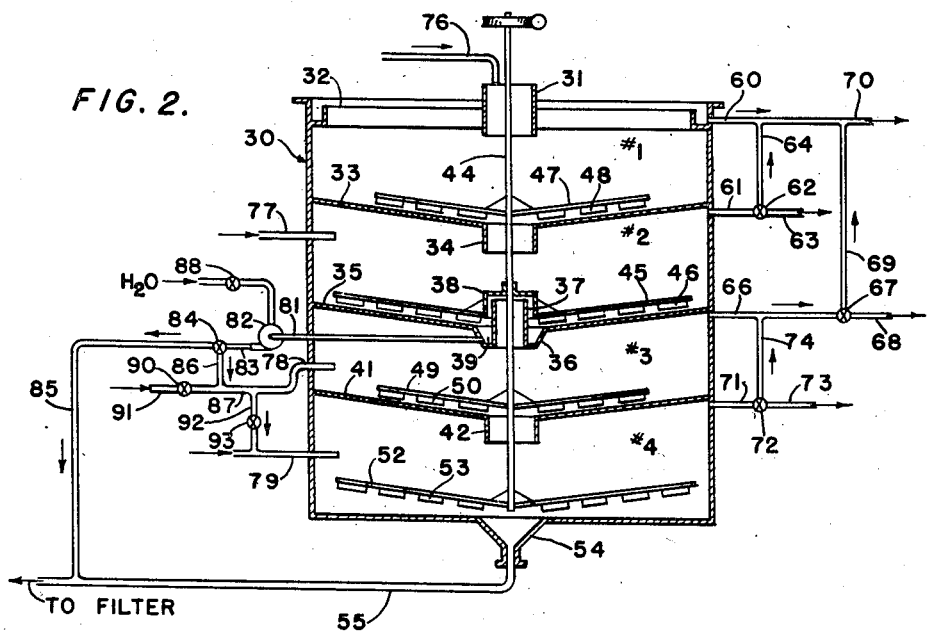

Fig. 2 shows the composite washing thickener station in greater detail, wherein 30 represents a tank housing the composite washing thickener and having as component parts a feedwell 31; an overflow weir 32, and a conical tray 33 having a downcast central boot 34 defining a common tray between a top compartment of the thickener called compartment No. 1, and a subjacent compartment No. 2. 35 indicates a subjacent conical tray having a central annular sludge or mud sump 36 and an upstanding opened-top boot 37; over which is disposed a cap or hood 38 to hold and maintain a yieldable sludge or mud seal 39 therebetween. This tray 35 defines the common limit between thickener compartments Nos. 2 and 3. Because of the annular mud sump 36, the upcast open top boot 37, the encircling cap or hood 38 spacedly disposed about and over the top edge of the boot, and yieldable mud seal 39 normally maintained as a yieldable seal in or between the parts just mentioned, the tray 35 may be referred to as a yieldably sealed tray, or seal tray.

Another conical tray 41 is disposed in the tank 30 beneath the tray 35, and this tray has a downcast boot 42. The tray 41 defines the common limit between compartments Nos. 3 and 4, with compartment No. 4 being the lowermost.

A shaft 44, rotated by any suitable means, extends vertically through the feedwell 31, the downcast boots 34 and 42, and the upstanding boot 37. The hood 38 is carried by the shaft and rotates with it, to which hood are attached rake arms 45 carrying sludge or mud-raking blades 46, for impelling sludge inwardly toward and into the sludge sump 36 as the rake arms and their blades rotate. The shaft 44 carries rake arms 47 and raking blades 48, similar to their equivalents 45 and 46, respectively, for raking or impelling sludge or mud settling as sediment on tray 33 toward and into the downcast boot 34 to descend further into the thickener.

Correspondingly, the shaft 44 carries arms 49 with blades 50 for raking the sludge or mud on tray 41 to and through the downcast boot 42. And finally, the shaft 42 carries arms 52 with blades 53 in compartment No. 4 for raking or impelling settled sludge or mud in compartment No. 4 to and into a bottom sludge- or mud-discharge sump 54. Mud thus thickened and discharged from the sump 54 passes as underflow from the thickener through a pipe or conduit 55. The rake arms are usually four in number in each compartment with one pair of arms usually being longer than another pair.

Clarified and decanted liquor overflows from compartment No. 1 over weir 32, to pass out therefrom in pipe or effluent outflow conduit 60. Clarified effluent liquor is decanted from compartment No. 2 by flowing out through pipe 61, functionally controlled such as by selector valve or selector valve means 62, to flow either directly outwardly as through pipe 63, or upwardly through a by-pass or riser pipe 64 to join effluent in the pipe 60. Clarified effluent liquor is decanted from compartment No. 3 through pipe 66, functionally controlled such as by a selector valve or selector valve means 67, to pass either directly outwardly through riser pipe 68 or upwardy through pipe 69 to join the effluent in extension or outlying portion 70 of pipe 60.

Clarified effluent from compartment No. 4 is decanted through pipe 71, functionally controlled as by selector valve 72, either to pass directly outwardly through pipe 73 or upwardly through riser pipe 74, to join the effluent in pipe 66.

Liquor for treatment in the thickener 30 is fed to the feedwell 31 through pipe 76, and liquor may also be fed to compartment No. 2 through pipe 77, to compartment No. 3, through pipe 78, and to compartment No. 4 through pipe 79.

Sludge or mud from the sludge or mud sump 36 in tray 35 may be drawn from compartment No. 2 through suction pipe 81, such as by means of a pump 82 and passed through pump discharge pipe 83, functionally controlled by means such as by a selector valve or selector valve means 84, either to pass outwardly through pipe 85, or downwardly through pipe 86, and thence inwardly through pipes 87 and 78 into both compartments Nos. 3 and 4 via pipe 78 into No. 3 and via pipes 92 and 79 into No. 4. Associated either with the pump, or the mud it withdraws, is a valve-controlled water supply pipe 88 through which diluent fluid or wash water may be supplied to the mud coming out from pipe 81.

If the selector valve 84 in pump discharge pipe 83 is shut off so that no mud flows through pipe 86, a stop valve 90 in pipe 91 can be opened to permit feed liquor to pass directly into the compartment No. 3 through pipe 87 and its continuation 78. Pipe 87 has pipe 92 associated therewith, controlled by some equivalent of valve 93, so that feed liquor may enter compartment No. 4 either directly through pipe 79, or into that pipe from pipe 92, extending through pipe 87.

Instead of the various valves indicated in Fig. 2, which are shown symbolically to illustrate control of function rather than the actual use of valves, a feed splitter station or box 17 is used; but if the various piping of Fig. 2 were shown in detail connected to the feed splitter 17, it would be so confusing as to be difficult to follow. For that reason, the plan was adopted to show valves in Fig. 2 so that a reader can follow the various flow possibilities by looking at that one figure; but actually every one of those flow possibilities can be practiced by a simple operation in the feed splitter 17, shown in Figs. 3 and 4.

Referring now to Figs. 3 and 4, the feed-splitter station is preferably made up of a box 17 having side walls 95, 96, 97, and 98 respectively, and a bottom 99. It has two transverse partitions 101 and 102, respectively, each having an overflow weir or V-shaped notch or notches 103 at their upper edge more or less central thereon. Between partition 101 and the box wall 98 is a secondary feed-receiving compartment or space 105, while a similar space 106 is provided between partition 102 and box wall 96. Shorter partitions 107 and 108 are respectively provided, extending at right angles to partitions 101 and 102, each having an overflow weir or V-shaped notch or notches 103, providing a further secondary feed-receiving space or compartment 110 between shorter partition 107 and box wall 95 while a similar space 111 is provided between shorter partition 108 and box wall 97. The inner rectangular space defined by the partitions 101 and 102, and the shorter partitions 107 and 108, comprises a primary feed-receiving space or compartment divided diagonally by a removable gate 112 into two primary feed-receiving spaces or compartments 113 and 114, respectively; but when the gate is removed, the spaces 113 and 114 comprise a single primary feed-receiving space or compartment.

Feed is passed to the central feed-receiving space 113 of the feed splitter 17, through the feed pipe 117 which connects with pipes 15, 60 and 61 shown in Fig. 2, and alternately with pipe 19 shown in that same figure. Feed may also be passed to the feed-splitter through pipe 118 leading to the central feed-receiving space 114 and connected with pipes 55, 81 and 88 shown in Fig. 2. Space 110 of the feed-splitter 17 is connected by pipe 77 to compartment No. 2 of the thickener of Fig. 2; space 111 is connected by pipe 79 to compartment No. 4; space 105 is connected by pipe 76 to compartment No. 1; while space 106 is connected by pipe 78 to compartment No. 3. The removable gate 112 is removably held in place by any suitable devices such as battens or batten strips indicated generally at 115.

Fig. 5 has been shown to illustrate in a simplified way the various flows of the liquids, irrespective of the actual apparatus limitations. For instance, in Fig. 2, where several sections of piping are required to make up a complete flow-path, and those sections are not shown in Fig. 5, because of the symbolism of that figure, reference numerals of the pipe sections that go to make up one flow line have been used on that line so that the reader, in tracing through the lines of flow shown in Fig. 5, can compare them with the more detailed apparatus shown, of Figs. 2 and 4. The foregoing statements apply with equal force to Fig. 6.

Fig. 5 is to illustrate the operation of the feed splitter and the composite washing thickener when the primary thickener station 14 is in operation. The operation of the feed splitter 17 and the composite thickener 30 may be said briefly to comprise operating compartments Nos. 1 and 2 of the thickener 30 in series with compartments Nos. 3 and 4 thereof. Compartments Nos. 1 and 2 are thus operated as one washing and thickening station for the underflow of primary thickener 14, while compartments Nos. 3 and 4, in another series, operate as a second thickening and washing station. With that in mind, it will be observed that the effluents 66 and 71, respectively, from compartments Nos. 3 and 4, are recirculated to be mixed with the underflow 15 from the primary thickener 14 in the compartment 113 of the feed splitter 17; that is, the effluents from compartments Nos. 3 and 4 are used as diluent liquid or wash water for mixing with the underflow from the thickener 14. This diluted mixture then goes through pipes 76 and 77 of compartments Nos. 1 and 2, respectively, of the washing thickener 30. Clarified effluent from these two compartments passes to use in the system through pipes 60, 61 and 70. Settled sludge or mud sedimented from compartments Nos. 1 and 2 is pumped out through pipe 81 and passed, via pipe 83, to feed splitter compartment 114, where it has diluent fluid such as wash water passed thereto through pipe 88. Such a mixture is then supplied to compartments Nos. 3 and 4 for further washing and thickening with the thickened underflow passing out through pipe 55 on its way to filtration.

Figure 6:
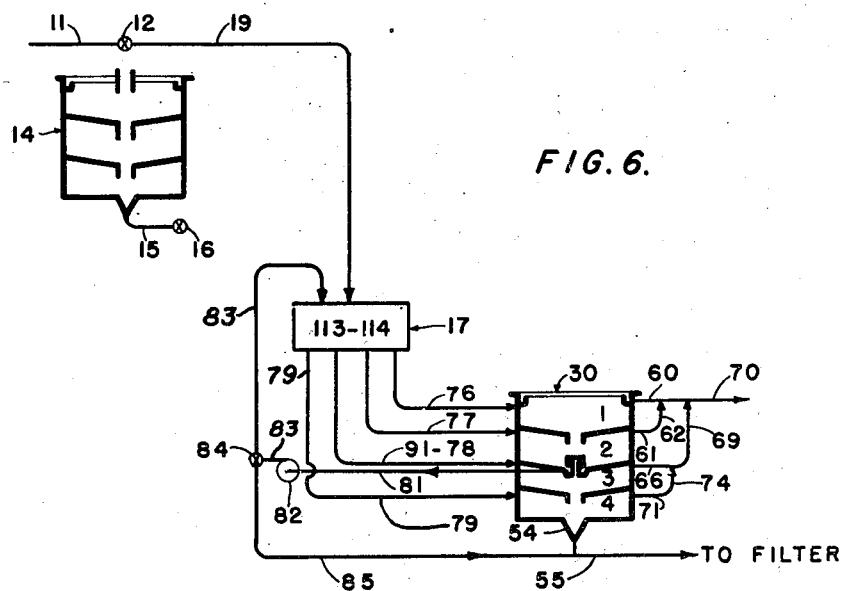
Fig. 6 is a view similar to Fig. 5, but showing the fluid flows when the primary thickener is down or out of operation, and therefore is completely by-passed so that the flow of unseparated mother liquor goes directly to the secondary composite washing thickener.
Figure 7:
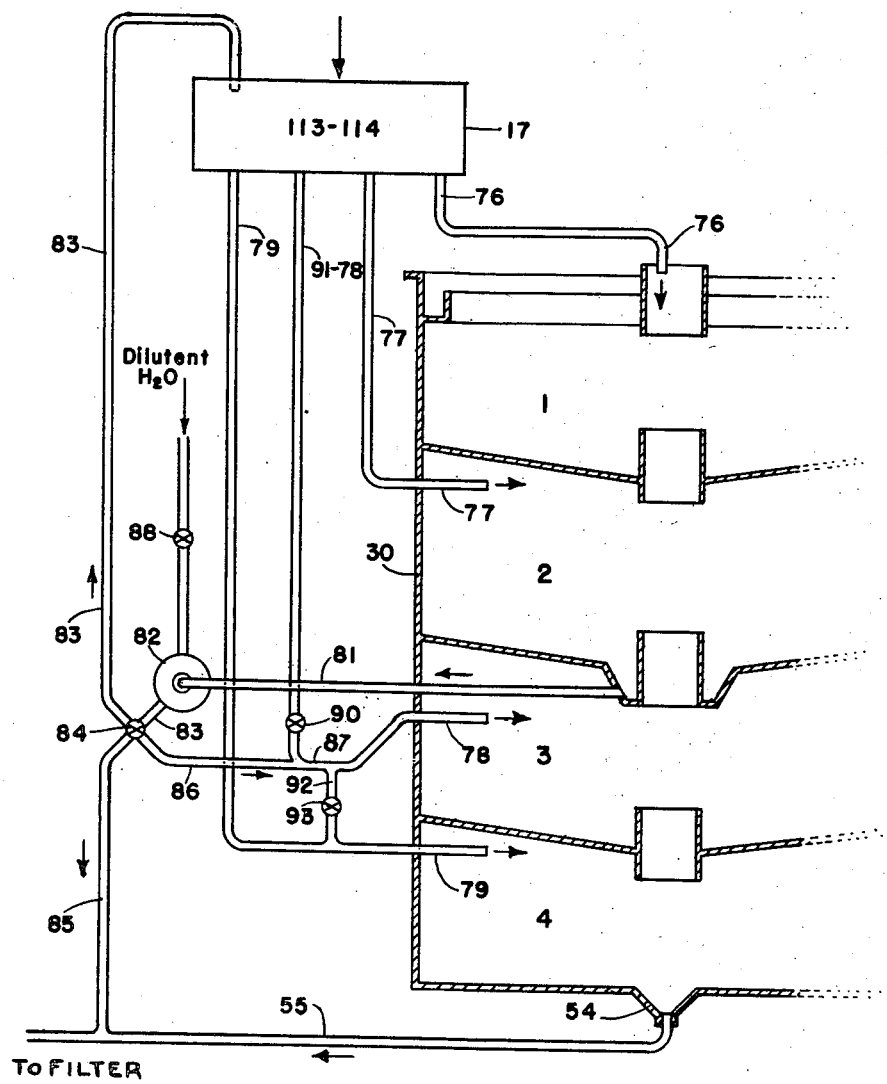
Fig. 7 is a diagrammatic view at a scale somewhat larger than that of the corresponding parts shown in Fig. 2, or in Figs. 5 and 6 and is provided to more clearly bring out the functioning arrangements of feed pipes, mud or sludge pipes, certain modes of connections of said pipes with respect to the tank and other interconnected parts of or between said pipes.

In Fig. 6, when the primary thickener 14 is down, the operation is much simpler in that the unseparated mother liquor is passed directly to the compartments 113-114 of the feed splitter 17, from whence it is passed independently directly to each of compartments Nos. 1, 2, 3 and 4. These compartments operate in parallel to the extent that clarified effluent overflowed from each compartment is all conducted into a common outflow pipe 70. Settled sludge or mud in compartments Nos. 1 and 2 is passed or pumped through three-way valve 84 and pipes 81 and 85 to join mud or sludge passing from compartments 3 and 4 through pipe 55. The joined sludges or muds then go to filtration.

Reverting for a moment to Fig. 2 and considering tray 35 between compartments Nos. 2 and 3, it is pointed out that the mud or sludge level in those compartments is normally such that there is maintained an annular column of mud 39 extending upwardly between the upcast boot 37 and its covering hood 38. This annular column of mud normally acts as a seal so that there is no passage of liquid from compartment No. 2 to compartment No. 3. However, this is a yieldable seal, because if by chance, liquid of compartments Nos. 3 or 4 were inadvertently drawn down, instead of the tray 35 collapsing due to the unsupported weight of liquid thereabove, the yieldable mud seal 39 would be forced by hydraulic pressure thereabove, upwardly and over the top edge of the upstanding boot 37, whereupon liquid above the thus broken yieldable mud seal would gush through the passageway then existing between boot 37 and its hood 38, until there was hydraulic balance between compartment No. 2 and the compartments Nos. 3 and 4 therebeneath. As soon as the balance was re-established, settled mud would again form the seal 39 automatically. While only one pump has been shown in the various figures, it is to be understood that pumps may be used where necessary, because little attention has been given to relative liquid levels in the drawing.

This invention is designed primarily for use in a green-liquor causticizing plant and, more particularly, in connection with a plant of the type shown and described in my pending Canadian application Serial No. 525,328 filed Apr. 7, 1945. However, it could be used in a soda-pulp mill or in a plant which produces caustic soda by the lime-soda process; and indeed, any other places where unseparated caustic mother liquor has to be treated.

The invention, when embodied in a plant, offers the utmost flexibility of operation and the purchaser of such a plant gets an extra stage or mud washing for little or no extra expense, because of the capability of the composite washing thickener station to be operated either as two washing stations operating in series or in a single washer, all of whose compartments are operating in parallel.

In operation therefore the primary thickener station 14 functions as is usual (Figs. 1 and 5) with its clarified effluent overflow decanting through pipe 18, while its thickened underflow passes through pipe 15, to compartment 113 of feed splitter 17 at one side of removable gate 112, in which compartment it is joined or mixed with overflowed effluent from thickener 30 compartments Nos. 3 and 4, passing thereto through pipes 66, 71, 74 and 68 (Figs. 2 and 5). From that compartment, mixed liquor flows to compartments Nos. 1 and 2 of thickener 30 through pipes 76 and 77 respectively. Into feed-splitter compartment 114 on the other side of removable gate 112, there is passed wash water through pipe 88 and underflow from compartments Nos. 1 and 2 of thickener 30, therein to be mixed and such mixed liquor carried to compartments Nos. 3 and 4 by pipes 78 and 79 respectively. Pipe 78 in Figs. 4 and 5 is made up of pipes 86, 87 and 78 in Fig. 2, while pipe 79 in Fig. 5 is made up of pipes 87, 92 and 79 in Fig. 2. Clarified white liquor discharges through pipe 70 and white mud through underflow pipe 55.

If for any reason, it is desired to cut out the primary thickener or clarifier 14, the operator turns the valve 12 which directs the incoming feed through pipe 19, thus by-passing the primary thickener 14, and removes the removable gate 112 from the feed-splitter 17, whereupon the flows change from those shown in Fig. 5 to those shown in Fig. 6. As there is no gate in the feed-splitter, all liquor passed thereinto flows out through pipes 76, 77, 78 ad 79 to feed such liquor independently to compartments Nos. 1, 2, 3 and 4 of thickener 30. Pipe 78 in Fig. 6 is shown in Fig. 2 to be made up of pipes 91 and 78, while pipe 79 in Fig. 6 is shown in Fig. 2 to be made up of pipes 93 and 79. Effluent from each compartment of thickener 30 is joined in pipe 70 and comprises white liquor ready for use. Settled mud from compartments Nos. 1 and 2, and mud from compartments 3 and 4 join in pipes 85 and 55 respectively and then passes to filtration or other treatment. Pipes 81, 83 and 85 are shown in Fig. 6 only as pipes 81 and 85, without any indications of pumps that might be necessary.

Whereas, this invention has been described as being useful in treating mother liquors in separating precipitated matter therefrom, it may also be used in leaching operations and the like by separating the residual solid matter from the solution in which it finds itself. Such latter uses include the separation of red mud residue from Bayer alumina plants, the residue from zinc leaching plants, cyanide plants, chromate plants, nickel leaching plants and copper leaching. Furthermore for washing plants to wash soluble materials out of solids. Also for series hydroseparation and elutriation for separating fine solids from granular in counter-current.

I claim:

1. Apparatus of the class described including a tray clarifier having a tank with a plurality of thickening compartments, an apertured tray separating adjoining compartments, outflow means for passing clarified liquid from the upper region of each compartment, means for removing sediment as mud along each tray to its aperture, means for removing mud from the bottom of the lowermost compartment, an upcast boot around the aperture in at least one of the trays, a hood supported in encircling position with respect to the boot but spaced therefrom to leave a mud-receiving space adapted during normal operation of the tank to contain mud therein for exercising a yieldable sealing function thereby completing with the boot and hood a yieldable sealing means and feed-supply means including a feed-splitting and distributing means having feed-pipe sections corresponding in number to the thickening compartments and of which feed-pipe sections each extends from said splitting means and functions for delivering liquid transferred thereby in the thickening compartment to which it corresponds, said apparatus being characterized in that the feed-splitter means is constructed for directing liquor received therein to compartments selectively at one time above the tray having the upcast boot and selectively at another time to compartment both above and below said tray having the upcast boot, and means for selectively passing mud from the mud-receiving space of said tray having the upcast boot either at one time to join mud within the means for removing mud from the lower compartment, or at another time into a compartment below said tray having the upcast boot, and means for adding washing fluid to the mud passing to a compartment below the tray having said upcast boot.

2. Apparatus according to claim 1 in which the mud of the yieldable sealing means of the tray having the upcast boot is provided by a normally maintained annular column of mud.

3. Apparatus according to claim 1, wherein the feed supplying and distributing means comprises a feed-splitting box having four independent side compartments and a substantially rectangular central compartment, a removable gate dividing the central compartment diagonally into two compartments with each diagonal compartment communicating with two side compartments respectively, a feed-liquor supply for each diagonal compartment, and a liquor-conducting feed pipe section associated with each of the side compartments and leading therefrom to a corresponding thickening compartment within the clarifier tank.

4. Apparatus of the class described including a tray clarifier having a tank and three conical centrally apertured trays extending transversely of the tank and with the tank forming four superposed thickening compartments of which trays the middle tray serving as a seal tray having an upcast boot around its aperture and the other trays each having a downcast boot around its aperture and provide therewith a free downflow passageway for mud and moved toward the apertured portion of the trays, a hood encircling the upcast boot of the seal tray but spaces therefrom to leave a mud seal containing space comprising a yieldable mud seal for that space exercising sealing functions during normal operation of the tank, actuatable bladed means for moving sediment as mud on each tray towards its aperture, driving means for actuating said bladed means, actuatable bladed means for moving sediment as mud on the tank bottom to a sediment discharge section leading from the bottom of the tank, an underflow pipe leading from said sediment discharge section to a region outside of the tank, feed-splitter means having associated feed pipe sections leading therefrom and provided for selectively directing liquor received therein and conducted therefrom by said feed pipe sections at one time to compartments above the seal tray and at another time to compartments both above and below the seal tray, means for withdrawing mud from the mud seal containing space of the seal tray and means for at one time selectively combining said withdrawn mud with the underflow pipe leading from the sediment-discharge section at the bottom of the tank and at another time combining said withdrawn mud with diluent and introducing the combination to at least one of the clarifying compartments and means for passing clarified effluent from the tank.

5. Apparatus of the class described including a tray clarifier having a tank with a plurality of thickening compartments, an apertured tray separating adjoining compartments, means for passing clarified liquor from the upper region of each compartment, means for removing sediment as mud along each tray to its aperture, means for actuating said sediment removing means, means for removing mud from the bottom of the lowermost compartment, an upcast boot around the aperture in at least one of the trays, a hood supported in encircling position to the boot but spaced therefrom to leave a mud-receiving space adapted during normal operation of the tank to contain mud therein exercising a yieldable sealing function; and including in characterizing combination a feed-splitter box having an independent side compartment for each of the thickening compartments, a central compartment, a removable gate dividing the central compartment into two triangular compartments each communicating with at least one of the side compartments respectively, a feed-liquor supply for each diagonal compartment, and a liquor-conducting pipe extending between each thickening compartment and a side compartment corresponding thereto.

6. Apparatus according to claim 5, wherein the removable gate divides the control compartment into two triangular compartments.

7. Apparatus according to claim 5, with the addition of a conduit for passing washing liquid to the feed splitter.

8. Apparatus of the class described including a tray clarifier having a tank with a plurality of thickening compartments, an apertured tray separating adjoining compartment, outflow means for passing clarified liquor from the upper region of each compartment, underflow means for moving mud from the lowermost compartment, at least one of the trays having a centrally disposed sludge sump portion of which the aperture of the tray is through the central section of the superposed sump portion, and from which thus apertured central section there rises an open top boot whereby to provide in conjunction with the tray a mud-receiving pocket, a functionally associated hood supported in encircling position with respect to but spaced about and somewhat from the upper edge of the boot to leave between them a mud-receiving space adapted during normal operation of the tank to contain mud extending upwardly thereinto from the body of mud in the depressed sump portion of the tray whereby the thus entrapped mud exercises a yieldable sealing function and thereby with the hood and with the boot equipped seal tray completes a yieldable sealing means, and feed- supply means including feed-splitting and distributing means having feed conduit sections corresponding in number to the thickening compartments and of which feed conduit sections each extends from said splitting means and functions for delivering liquid transferred thereby into the thickening compartment to which it corresponds, said apparatus being characterized in that there is also included in operative combination a pump; a suction pipe line leading to the pump from within the depressed sump portion of the seal tray; a discharge pipe line leading from said pump and in communication with the underflow means for moving mud from the lowermost compartment, a selector valve in said discharge pipe line, and a branch line leading from said selector valve to a feed conduit section leading into a compartment below the seal tray, which selector valve is provided whereby when in one flow-functioning position therefor there is an optional passing of pump discharge to a feed conduit section leading to a compartment below the seal tray and when in another flow-functioning position therefor there is an optional passing of pumped material into the underflow means for moving mud from the lowermost compartment.

9. Apparatus according to claim 8, in which the feed conduit section leading to the compartment immediately below the seal tray has a shut-off valve therein, and in which there is a branch line leading from the selector valve and terminating in the last-mentioned feed conduit section at that portion thereof which is between said shut off valve and the discharge end of the feed conduit section.

10. Apparatus according to claim 8, in which the feed conduit section leading to a compartment below the seal tray has a shut-off valve therein and in which the branch line leading from the pump discharge terminates in the feed conduit sections just referred to at a location between said shut-off valve and the discharge end of the feed conduit section in which the shut-off valve is located; and in which there is a second valve-controlled branch line leading from the discharge section of the last-mentioned valve-controlled feed conduit section into another feed-conduit section leading in to a still lower compartment.

11. Apparatus of the class described including a tray clarifier having a tank with a plurality of thickening compartments; an apertured tray separating adjoining compartments; outflow means for passing clarified liquor from the upper region of each compartment; means for removing mud from the bottom of the lowermost compartment; an upcast boot around the aperture of at least one tray which is hereby termed a seal tray; a hood supported in encircling position with respect to the boot but spaced somewhat to leave a mud-receiving space adapted during normal operation of the tank to contain mud therein exercising a yieldable sealing function thereby completing a yieldable sealing means; and feeding supply means including feed splitting and delivering means having a feed-conduit section for and corresponding to each of the thickening compartments and of which the respective feed-conduit sections extend from said splitting means and is provided for delivering liquid into the thickening compartment to which it corresponds; said apparatus being characterized in that an outflow means leading from a compartment below the seal tray is provided with a selector valve means and a riser conduit section leading from said valve means to and into an upper outflow means; said selector valve means being constructed so that when a movable valve element of the selector valve means is in one position therefor it permits direct outflow only through the outflow means in which it is located and also constructed so that when the movable valve element is in another position therefor it provides a diverted flow from the outflow means in which the valve is located thence into and through the riser conduit section and therefrom into and from the upper outflow means to which the riser is connected.

12. Apparatus of the class described including a tray clarifier having a tank with a plurality of thickening compartments; an apertured tray separating adjoining compartments; effluent outflow means for passing clarified liquor from the upper region of each compartment; means for moving mud from the lowermost compartment; an upcast boot around the aperture of at least one tray herein designated as a seal tray and a functionally associated hood supported in encircling position with respect to but spaced somewhat from the boot to leave between them a mud-receiving space adapted during normal operation of the tank to contain mud therein for exercising a yieldable sealing function; and feeding supply means including feed-splitting means and liquor distributing elements providing feed pipes corresponding in number to the thickening compartments and of which feed pipes each extends from said splitting means and functions for delivering liquid transferred thereby into the thickening compartment to which it corresponds; said apparatus being characterized in that for a thickener compartment below the seal tray and for the outflow means leading therefrom the latter is equipped with a selector valve and a riser by-pass conduit leading from said selective valve to and in hydraulic communication with an outflow means leading from a thickener compartment above the seal tray, which said selector valve and riser by-pass conduit is provided whereby the selector valve can be positioned for permitting at one period a direct outflowing effluent past the selector valve through the outflow means in which the valve is located without the effluent entering and flowing upwardly through the riser conduit or alternatively whereby the valve means can be positioned for directing at another period a diverted flow from the conduit in which the selector valve is located into and upwardly through the riser conduit and thereby into the upper outflow conduit whereby there is a combined passing of the clarified effluent from the particular compartments involved into and outwardly along and from the outflow means leading from the upper conduit.

13. Apparatus according to claim 12, in which the tank of the tray clarifier is divided into two upper compartments, namely a first and a second compartment with the second subjacent to the first, constituting an upper set of which the compartments are functionally separated from each other except through an apertured tray providing for constant free hydraulic communication between them through the apertured portion of the tray and two lower compartments, namely a third and a fourth compartment with the fourth subjacent to the third, constituting a lower set of which the compartments are functionally separated from each other except through an apertured tray providing for constant free hydraulic communication between the apertured portion of the tray but of which the upper set of thickening compartments is separated from the lower set of thickening compartments through the medium of a seal tray equipped with yieldable mud-sealing means at and about the apertured portion of the tray; and of which the outflow means of the second compartment has selector valve means and by-pass conduit rising and leading from the outflow means of the second compartment into the outflow means of the first compartment and in which the outflow means of the fourth compartment has selector valve means and by-pass conduit rising and leading from the outflow means of the fourth compartment into the outflow means of the third compartment.

14. Apparatus according to claim 13, in which the tank of the tray clarifier is divided into two upper compartments, namely a first and second compartment with the second subjacent to the first, constituting an upper set and two lower compartments, namely a third and fourth compartment with the fourth subjacent to the third, constituting a lower set of which the sets are separated from each other except through the medium of the seal tray providing a yieldable mud-sealing means; and of which the outflow means of the second compartment has selective valve means and by-pass conduit section rising and leading from the outflow means of the second compartment into the outflow means of the first compartment; and of which the outflow means of the fourth compartment has selector valve means and by-pass conduit section rising and leading from the outflow means of the fourth compartment into the outflow means of the third compartment and of which the outflow means of the third compartment has a second selector valve means and a second by-pass conduit section rising and leading from outflow means of the third compartment into the outflow means of the first compartment.

CYRIL H. KNIGHT.

REFERENCES CITED

The following references are of record in the file of this patent:

UNITED STATES PATENTS

| Number | Name | Date |
|---|---|---|
| 1,770,353 | Weber | July 8, 1930 |
| 2,233,641 | Ramsey | Mar. 4, 1941 |
| 2,239,604 | Harms | Apr. 22, 1941 |
| 2,344,355 | Harms | Mar. 14, 1944 |
| 2,402,649 | Logue | June 25, 1946 |